United States Patent
Schulze et al.

(10) Patent No.: US 9,409,452 B2
(45) Date of Patent: Aug. 9, 2016

(54) METHOD FOR CONTROLLING THE TIRE PRESSURE IN MULTIPLE-AXLE VEHICLES

(75) Inventors: Gunter Schulze, Ispringen (DE); Karl-Heinrich Preis, Bühlertal (DE)

(73) Assignee: HUF HULSBECK & FURST GmbH & CO. KG, Velbert (DE)

( * ) Notice: Subject to any disclaimer, the term of this patent is extended or adjusted under 35 U.S.C. 154(b) by 539 days.

(21) Appl. No.: 11/524,181

(22) Filed: Sep. 20, 2006

(65) Prior Publication Data
US 2007/0069878 A1   Mar. 29, 2007

(30) Foreign Application Priority Data

Sep. 23, 2005  (DE) .................. 10 2005 045 409
Oct. 29, 2005  (DE) .................. 10 2005 051 951

(51) Int. Cl.
*B60C 23/00* (2006.01)
*B60C 23/04* (2006.01)
*B60C 23/06* (2006.01)

(52) U.S. Cl.
CPC ........... *B60C 23/0408* (2013.01); *B60C 23/007* (2013.01); *B60C 23/061* (2013.01)

(58) Field of Classification Search
CPC .............. B60C 23/0408; B60C 23/041; B60C 23/0447; B60C 23/0433; B60C 23/06; B60C 23/061; B60C 23/0403; B60Q 1/54
USPC ............... 340/438, 425.5, 3.1, 825, 442–445; 701/81, 41, 86, 1; 73/146, 146.2, 146.5
See application file for complete search history.

(56) References Cited

U.S. PATENT DOCUMENTS

| | | | | |
|---|---|---|---|---|
| 5,343,741 | A * | 9/1994 | Nishihara et al. | 73/146.2 |
| 5,629,478 | A * | 5/1997 | Nakajima et al. | 73/146.2 |
| 6,748,799 | B2 * | 6/2004 | Fischer et al. | 73/146.5 |
| 6,956,471 | B2 * | 10/2005 | Tamimi et al. | 340/442 |
| 2002/0157461 | A1 * | 10/2002 | Schmidt et al. | 73/146 |
| 2003/0201879 | A1 * | 10/2003 | Munch et al. | 340/442 |

FOREIGN PATENT DOCUMENTS

GB     2270167 A    3/1994

* cited by examiner

*Primary Examiner* — An T Nguyen
(74) *Attorney, Agent, or Firm* — Hackler Daghighian & Martino

(57) ABSTRACT

A method for controlling the tire pressure in multiple axle vehicles whose wheels are equipped with pneumatic tires and speed sensors that supply an evaluation unit with signals indicative of the speed of the respective wheel, by (a) determining simultaneously the speed of a right-hand wheel and a left hand wheel mounted on a common axle;
(b) determining the deviation between the two speeds;
(c) reducing the deviation in speed by a correction value representative, during a cornering motion, of that component of the deviation n speed between the right-hand wheel and the left-hand wheel which is due to the cornering motion: and
(d) indicating the corrected deviation in speed, or of a signal derived therefrom, at least when the correct deviation in speed exceeds a given threshold value.

24 Claims, 2 Drawing Sheets

METHOD FOR CONTROLLING THE TIRE PRESSURE IN MULTIPLE-AXLE VEHICLES

BACKGROUND OF THE INVENTION

1. Field of the Invention

The present invention relates to a method for controlling the tire pressure in multiple-axle vehicles whose wheels are equipped with pneumatic tires and speed sensors that supply an evaluation unit with signals indicative of the speed of the respective wheel, by (a) determining simultaneously the speed of a right-hand wheel and of a lefthand wheel mounted on a common axle;
(b) determining the deviation between the two speeds;
(c) reducing the deviation in speed by a correction value representative, during a cornering motion, of that component of the deviation in speed between the right-hand wheel and the left-hand wheel which is due to the cornering motion; and
(d) indicating the corrected deviation in speed, or of a signal derived therefrom, at least when the corrected deviation in speed exceeds a given threshold value.

2. Description of Related Art

It has been known in connection with vehicles, the wheels of which are equipped with an anti-block system (ABS), that the ABS can be used also for deriving information on the tire pressure. This is due to the fact that any drop in tire pressure will reduce the rolling radius of the wheel so that the spin velocity of the wheel will increase as the tire pressure decreases—related to a given vehicle speed. Anti-block systems comprise speed sensors on each wheel which monitor the spinning velocity of the wheels in order to permit early detection of any blocking risk for the respective wheel. Anti-block systems therefore supply a signal for each wheel that indicates the spinning velocity of the respective wheel. An evaluation unit provided in the vehicle, which receives other signals as well, derives from the speed signals information of the rolling radius and, thus, the tire pressure of the respective wheel. However, the spinning velocity of a wheel depends not only on the rolling radius and the vehicle speed, but also on the driving condition, i.e. whether the wheel is running straight ahead or is cornering. When cornering, the outer wheels, relative to the curve, have to run a longer way than the inner wheels, relative to the curve, so that any difference between the speed of the right-hand wheel and the speed of the left-hand wheel mounted on one and the same axle may not necessarily, or exclusively, be due to differences in tire pressure, but may be caused also by a cornering motion of the vehicle. It has, therefore, been known to supply the evaluation signal unit with additional signals from a steering angle transmitter. The steering angle transmitter picks up any rotary movements of the steering column of the vehicle and signals them to the evaluation unit. The relation between the radius of curvature and the steering angle being known, it is possible for the evaluation unit to calculate from the signal received from the steering angle transmitter the radius of the curve along which the vehicle is moving. That radius then serves as a basis for calculating the difference in speed between a right-hand wheel and a left-hand wheel on a common axle that is due to the cornering movement. If the difference in speed measured is corrected by that value, and if a difference in speed is still left after such correction, then this is taken as a measure for the deviation between the tire pressure of the right-hand wheel and the left-hand wheel, which is then signaled to the driver in order to warn him when it exceeds a given threshold value.

In the case of vehicles where the wheels cannot be steered, no steering signal can be obtained for correcting any speed difference between a right-hand wheel and a left-hand wheel during cornering of the vehicle. This speaks against the use of an ABS-supported tire pressure control solution in vehicles that do not have any steered wheels. This is true in particular for commercial vehicle trailers. In the case of such trailers, tire pressure is normally monitored, while the vehicle is in motion, using pressure sensors provided on each wheel for transmitting the detected tire pressure value to a receiver placed in the vehicle which then evaluates the pressure signals and signals to the driver any abnormal pressure or abnormal pressure curve that may be detected. Although tire pressure control systems using pressure sensors placed on wheels permit the pressure to be monitored exactly, they unfortunately are more expensive than ABS-supported tire pressure control systems.

BRIEF SUMMARY OF THE INVENTION

Now, it is the object of the present invention to provide a way of performing tire pressure control in vehicles that do not supply useful steering signals while the vehicle is in motion, which requires less input than a tire pressure control system where each wheel is equipped with a separate pressure sensor.

DETAILED DESCRIPTION OF THE INVENTION

Figure 1:
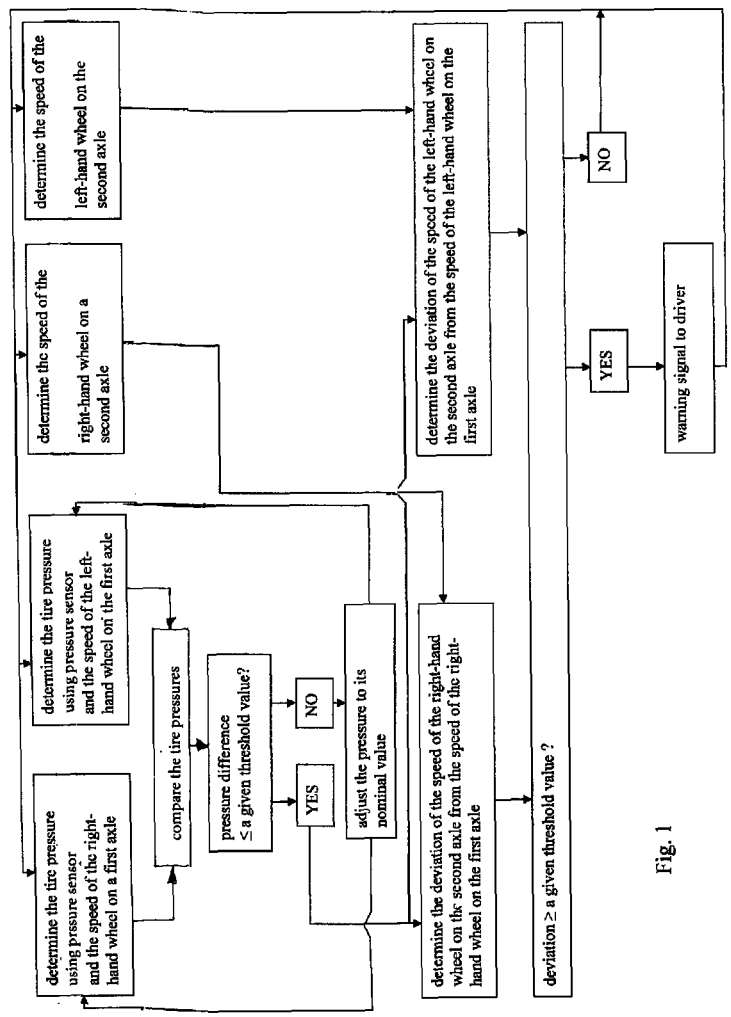
FIG. 1 is a flow diagram of a method according to claim 1.
Figure 2:
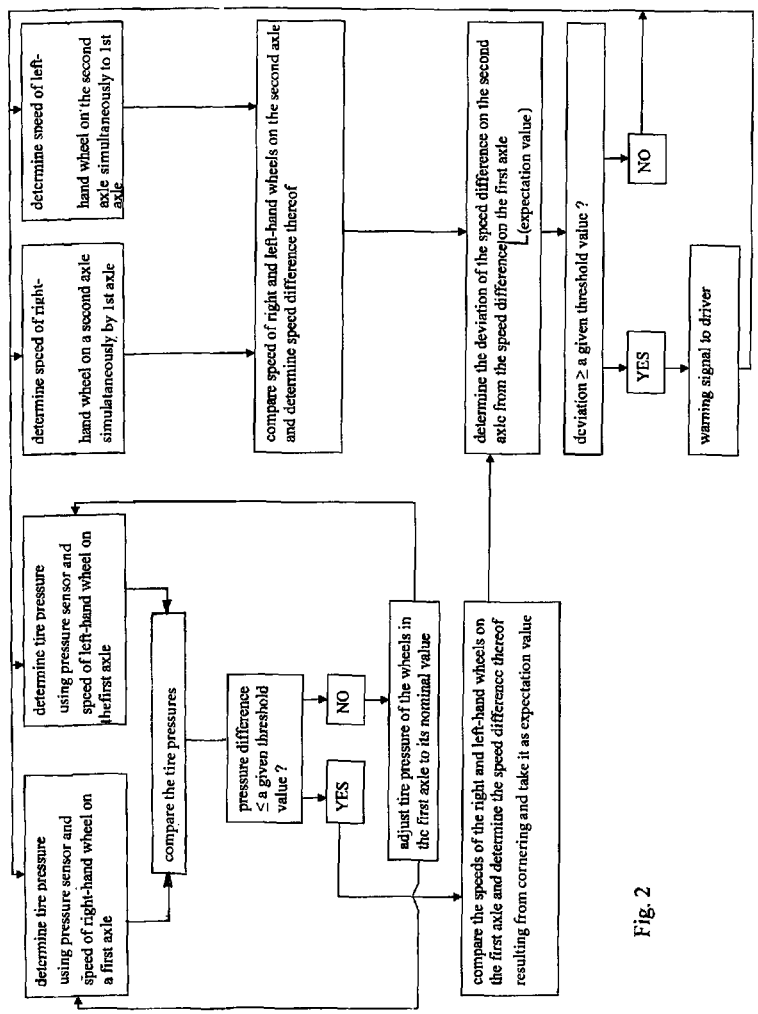
FIG. 2 is a flow diagram of the method according to claim 2.

This object is achieved by a method for controlling the tire pressure in multiple axle vehicles whose wheels are equipped with pneumatic tires and speed sensors that supply an evaluation unit with signals indicative of the speed of the respective wheel, by (a) determining simultaneously the speed of a right-hand wheel and of a left hand wheel mounted on a common axle;
(b) determining the deviation between the two speeds;
(c) reducing the deviation in speed by a correction value representative, during a cornering motion, of that component of the deviation in speed between the right-hand wheel and the left-hand wheel which is due to the cornering motion; and
(d) indicating the corrected deviation in speed, or of a signal derived therefrom, at least when the corrected deviation in speed exceeds a given threshold value, in which the tire pressure of a right-hand wheel and of a left-hand wheel on one of the axles is additionally measured, and transmitted to the evaluation unit, during motion, the tire pressure of the right-hand wheel is compared with the tire pressure of the left-hand wheel and, if the two values correspond one to the other, any difference between the speeds of the two wheels, determined at the same time or at a near point in time, is regarded as being due to a cornering motion, the speed of the left-hand wheel is taken as an expectation value of the speed of the other wheels, having no pressure sensors, on the left-hand side of the vehicle, the speed of the right-hand wheel is taken as an expectation value of the speed of the other wheels, having no pressure sensors, on the right-hand side of the vehicle, and
the speed of the wheels, having no pressure sensors, is compared with the relevant expectation value, and the driver is warned when the deviation between them exceeds a given threshold value.

According to another aspect of the invention the object is achieved by a method for controlling the tire pressure in multiple-axle vehicles whose wheels are equipped with pneumatic tires and speed sensors that supply an evaluation unit with signals indicative of the speed of the respective wheel, by
(a) determining simultaneously the speed of a right-hand wheel and of a left hand wheel mounted on a common axle;
(b) determining the deviation between the two speeds:
(c) reducing the deviation in speed by a correction value representative, during a cornering motion, of that component of the deviation in speed between the right-hand wheel and the left-hand wheel which is due to the cornering motion; and
(d) indicating the corrected deviation in speed, or of a signal derived therefrom, at least when the corrected deviation in speed exceeds a given threshold value, in which the tire pressure of a right-hand wheel and of a left-hand wheel on one of the axles is additionally measured, and transmitted to the evaluation unit, during motion, the tire pressure of the left-hand wheel is compared with the tire pressure of the right-hand wheel and, if the two values correspond one to the other, a difference in speeds between those two wheels, determined simultaneously or at a near point in time one relative to the other, is taken as an expectation value for the difference in speed of the other pairs, consisting each of one left-hand and one right-hand wheel, having no pressure sensor and arranged on a common axle, and the difference in speed between the pair of wheels, having no pressure sensors, is compared with the expectation value and the driver is warned when the deviation between the speed difference and the expectation value exceeds a given threshold value.

In the case of vehicles whose wheels are equipped with pneumatic tires and speed sensors that supply an evaluation unit with signals indicative of the spin velocity of the respective wheel, the invention provides that, just as in the case of the known ABS-supported tire pressure control system, the speed, and the deviation in speed, of any pair of two wheels mounted on the same axle on the right-hand side and on the left-hand side of the vehicle, respectively, the deviation which may be due either to a difference in pressure between the two wheels or to a cornering motion, is corrected by a correction value representative of that component of the deviation in speed between the righthand wheel and the left-hand wheel which is due to the cornering motion. However, according to the invention that correction value is not derived from a steering signal, but is supplied by an arrangement where the tire pressure of a right-hand wheel and of a left-hand wheel on one of the axles is additionally measured, and transmitted to the evaluation unit, during motion, the tire pressure of the right-hand wheel is compared with the tire pressure of the left-hand wheel and, if the two values correspond one to the other, any difference between the speeds of the two wheels, determined at the same In the context of the present invention a speed difference is regarded as having been determined "at a near point in time" when the tire pressure has changed during that time to an insignificant degree only, with respect to the tire pressure control.

The solution provided by independent claim 2 differs from the one described in independent claim 1 in that it is the difference in speeds between the two wheels equipped with a pressure sensor that is taken as the expectation value for the difference in speed of the other wheels, which are arranged in pairs one on the right-hand side and one on the left-hand side of a common axle, and that the difference in speed between the pair of wheels, having no pressure sensors, is compared with the expectation value and the driver is warned in any case when the deviation between the speed difference and the expectation value exceeds a given threshold value.

In both cases useful tire pressure control is achieved in an ABS-supported tire pressure control system even without evaluation of a steering signal already by the use of only two pressure sensors on a vehicle on which at least four wheels are to be monitored. Typically, a trailer is equipped with three non-steered axles with two wheels each. Compared with a conventional tire pressure control system, which would require for such a trailer six tire pressure sensors with the associated power supply, control, transmitter and sending aerial, only two tire pressure sensors are required according to the invention. The cost advantage provided by the invention is even more important for trailers and other vehicles with more than three non-steered axles and, in certain cases, with twin tires. The invention constitutes an extremely low-cost improvement of an ABS supported tire pressure control system, and even is the first to make such a system serviceable for vehicles having no steered axles or wheels.

According to the solution proposed in claim 1, the wheels on the right-hand side of the vehicle can be compared, with respect to their rolling radius, with the one wheel on the right-hand side which is equipped with a pressure sensor. Similarly, the wheels on the left-hand side of the vehicle can be compared, with respect to their rolling radius, with the one wheel on the left-hand side of the vehicle which is equipped with a pressure sensor. The speed values supplied for the wheels are compensated with respect to the speed components resulting from any cornering motion, using the difference in speed which the two wheels, that are equipped with a pressure sensor, exhibit at corresponding tire pressures so that the pressure comparison can be carried out between the wheels on the right-hand side and between the wheels on the left-hand side and an alarm signal can be supplied to the driver when the deviations fall below a given threshold value. The alarm signal may have different contents. For example, it may be a simple warning regarding a given wheel, indicating simply that a threshold value has been exceeded, in which case the position of the wheel can be indicated on a display by a lamp, for example. Or the warning
may consist of a text indicating the particular wheel and the degree of the pressure deviation. Or else, the warning may request the driver to take the next opportunity to stop the vehicle and to correct the tire pressure or—if a dangerous deviation occurs—to stop immediately and to correct the tire pressure at once.

According to the solution of claim 2, the driver is warned when the pressure difference between one wheel on the right-hand side and one wheel on the lefthand side of the same axle exceeds a given threshold value. This solution is based on the consideration that a pressure drop, especially a dangerous pressure drop, will not normally develop in the same manner and to the same degree in the two wheels on a common axle.

Preferably, the deviation in speed determined according to the invention is normalized at a reference speed, especially at the speed of the right-hand wheel or at the speed of the left-hand wheel or at a mean value of those speeds. This provides the advantage that in this case tire wear and traveling speed will have little influence on tire pressure control.

In order to determine the component of the measured speed value or a measured speed difference, that is due to a cornering motion, using the pressure sensors, pressures corresponding one to the other are required in the tires of the two wheels equipped with the pressure sensors. According to an advantageous further development of the invention, the driver therefore is requested to adjust the tire pressure of the two tires, being monitored by
pressure sensors, to an equal value if the pressure values measured with the aid of the pressure sensors do not correspond one to the other. Otherwise, the driver would be required to check the pressure manually at regular intervals, Such regular manual checks, performed as a precautionary measure, may however be rendered superfluous by a warning that the tire pressure should be
adjusted to an identical level, as prescribed, when the pressure values measured are found to be different.

Exactly corresponding tire pressure values are found in rare cases only. According to an advantageous further development of the intention it is, therefore, provided that the pressure values supplied by the two pressure sensors are regarded to correspond one to the other as long as the difference between them remains below a predetermined pressure difference threshold value. The pressure difference threshold value is selected so that the accuracy of the tire pressure control resulting from such selection just remains within tolerable limits. Preferably, the pressure difference threshold value, up to which the pressure values supplied will be regarded as corresponding one to the other, is selected to be 5% up to 10% of the nominal tire pressure recommended or prescribed by the vehicle manufacturer. For commercial vehicles, the tire pressure threshold value up to which the signaled pressure values are to be regarded as corresponding one to the other preferably is selected to be 0.4 bar.

If deviations from the nominal tire pressure are measured on all wheels equipped with a pressure sensor then such deviation values can be used for adapting the expectation value of the speed of those wheels which are not equipped with pressure sensors, If the pressure measured in a wheel is lower than a nominal tire pressure, then the respective wheel will revolve at a spin velocity higher than under conditions of the nominal tire pressure, and a correspondingly high spin velocity will also be expected for the other wheels on the same vehicle side. Now, by correcting the expected spin velocity downwardly by the measured pressure deviation value, more precise pressure monitoring is achieved for the wheels not equipped with pressure sensors. However, when a tire pressure value higher than the nominal tire pressure is measured in one of the wheels equipped with a pressure sensor, then a greater rolling radius will lead to an excessively small expectation value for the speed
so that, preferably, that value preferably should be corrected upwardly in correspondence with the detected deviation from the nominal tire pressure.

In cases where the driver is informed that the tire pressure values of the wheels equipped with pressure sensors, signaled to the evaluation unit, correspond one to the other whereas they deviate from the nominal tire pressure recommended or prescribed by the vehicle manufacturer, then there are different possible ways of proceeding. If the deviation of the tire pressure values from the nominal tire pressure is not so serious that rapid correction of the tire pressure would be required, then it can be assumed, for evaluating the measured speeds, that the pressure indicated by the tire pressure sensors is the nominal tire pressure. This would have the result that the warning limits would be shifted; possibly the driver may in this case be warned later, i.e. only in the presence of a higher deviation of the tire pressure, than would have been the case if the pressure of the tires monitored by the tire pressure sensors actually had been the nominal tire pressure. However, there is also the possibility to adapt the threshold value for warning the driver when the value is exceeded as a function of the deviation of the measured tire pressure from the nominal tire pressure, especially in proportion to the relative deviation of the signaled tire pressure from the nominal tire pressure. This would permit the warning limits originally set to be maintained. In any case it is, however, recommendable to request the driver to correct the pressure of the two tires, provided with pressure sensors, to their nominal value at the next opportunity and to thereby restore the correct basis for valuation of the speeds measured.

When the two pressure sensors signal different tire pressure values and the difference is greater than the predetermined pressure difference threshold value up to which the pressure values preferably are regarded as corresponding one to the other, then the speed difference determined for the wheels equipped with pressure sensors cannot be used as an expectation value for the other wheels not equipped with pressure sensors. In that case, the driver should be signaled that the pressure difference threshold value has been exceeded, and should be requested to readjust the nominal pressure in the two wheels as soon as possible in order to restore the full serviceability of the tire pressure control system.

In the case of vehicles having more than two non-steered axles, the two pressure sensors should be arranged on one of the middle axles, where the radii on which the right-hand wheel and the left-hand wheel, respectively, are running are the closest to the radii on which the other wheels on the right-hand side and the left-hand side, respectively, of the vehicle are running during cornering of the vehicle.

The invention claimed is:

1. Method for controlling the tire pressure in multiple-axle vehicles whose wheels are equipped with pneumatic tires and speed sensors that supply an evaluation unit with signals indicative of the speed of the respective wheel, the method comprising the steps of:
   determining simultaneously the speed of a right-hand wheel and of a left-hand wheel mounted on a first common axle;
   determining a difference between the two speeds;
   simultaneously or at a near point in time measuring with pressure sensors during motion of the vehicle the tire pressure of the right-hand wheel and of the left-hand wheel on said first common axle and transmitting the pressure values to the evaluation unit;
   comparing the tire pressure of the right-hand wheel with the tire pressure of the left-hand wheel and, if the two values correspond one to the other, any difference between the speeds of the two wheels is taken as resulting from a cornering motion;
   taking the speed of the left-hand wheel on said first axle as a first expectation value of the speed of other wheels, having no pressure sensors, on other axles and on the left-hand side of the vehicle;
   taking the speed of the right-hand wheel on said first axle as a second expectation value of the speed of other wheels, having no pressure sensors, on the other axles and on the right-hand side of the vehicle;
   comparing the speed of the right-hand wheels, having no pressure sensors, with the second expectation value for the speed of these right-hand wheels;
   comparing the speed of the left-hand wheels, having no pressure sensors, with the first expectation value for the speed of these left-hand wheels; and
   warning the driver when the deviation between the speed of a wheel, having no pressure sensor, and its expectation value exceeds a given threshold value;

wherein the method does not use a steering angle transmitter and/or a steering angle measurement.

2. Method for controlling the tire pressure in multiple-axle vehicles whose wheels are equipped with pneumatic tires and speed sensors that supply an evaluation unit with signals indicative of the speed of the respective wheel, the method comprising the steps of:

determining simultaneously the speed of a right-hand wheel and of a left-hand wheel mounted on a common axle;

determining a difference between the two speeds;

simultaneously or at a near point in time measuring with pressure sensors during motion of the vehicle the tire pressure of the right-hand wheel and of the left-hand wheel on said first common axle and transmitting the pressure values to the evaluation unit;

comparing the tire pressure of the right-hand wheel with the tire pressure of the left-hand wheel and, if the two values correspond one to the other, any difference between the speeds of the two wheels is taken as resulting from a cornering motion and is taken as an expectation value for the difference of the speeds of a right-hand wheel and of a left-hand wheel on a second axle which speeds of the wheels on the second axle are determined simultaneously with or at a near point of time as the speeds of the wheels on the first axle;

determining simultaneously or at a near point of time the speeds of the right-hand wheel and of the left-hand wheel on said second common axle as well as the difference of these speeds, the wheels on said second axle having no pressure sensors;

comparing the difference in speed between the pair of wheels on said second axle with said expectation value; and warning the driver of the vehicle when the deviation between the speed difference of the wheels on the second axle and the expectation value exceeds a given threshold value;

wherein the method does not use a steering angle transmitter and/or a steering angle measurement.

3. The method as defined in claim 1, wherein the deviation in speed is normalized at a reference speed.

4. The method as defined in claim 3, wherein either the speed of the right-hand wheel or the speed of the left-hand wheel mounted on the same first axle, or the mean value of the two speeds, is taken as a reference value.

5. The method as defined in claim 1, wherein the driver is requested to adjust the tire pressure of the two tires, being mounted on the first axle and monitored by pressure sensors, to an equal value if the pressure values measured do not correspond one to the other.

6. The method as defined in claim 1, wherein the pressure values supplied by the two pressure sensors are regarded to correspond one to the other as long as the difference between them remains below a predetermined pressure difference threshold value.

7. The method as defined in claim 6, wherein the pressure difference threshold value, up to which the pressure values supplied will be regarded as corresponding one to the other, is selected to be 5% up to 10% of the nominal tire pressure recommended or prescribed by a vehicle manufacturer.

8. The method as defined in claim 6, wherein the tire pressure threshold value up to which the signaled pressure values are regarded as corresponding one to the other, is selected to be 0.4 bar for commercial vehicles.

9. The method as defined in claim 1, wherein the driver is informed, when the tire pressure values signaled to the evaluation unit correspond one to the other, but deviate from the nominal tire pressure recommended or prescribed by the vehicle manufacturer.

10. The method as defined in claim 1, wherein the threshold value is adapted when the tire pressure values signaled to the evaluation unit correspond one to the other, but deviate from a nominal tire pressure recommended or prescribed by the vehicle manufacturer.

11. The method as defined in claim 10, wherein the threshold value is adapted in proportion to a relative deviation of the signaled tire pressure from the nominal tire pressure.

12. The method as defined in claim 1, wherein in the case of vehicles having more than two axles the pressure sensors are placed on wheels mounted on a middle axle.

13. The method as defined in claim 1, wherein the expectation values of the speed are adapted when a deviation from the tire pressure is measured in any of the wheels equipped with a pressure sensor.

14. The method as defined in claim 2, wherein the deviation in speed is normalized at a reference speed.

15. The method as defined in claim 14, wherein either the speed of the right-hand wheel or the speed of the left-hand wheel mounted on the same first axle, or the mean value of the two speeds, is taken as a reference value.

16. The method as defined in claim 2, wherein the driver is requested to adjust the tire pressure of the two tires, being mounted on the first axle and monitored by pressure sensors, to an equal value if the pressure values measured do not correspond one to the other.

17. The method as defined in claim 2, wherein the pressure values supplied by the two pressure sensors are regarded to correspond one to the other as long as the difference between them remains below a predetermined pressure difference threshold value.

18. The method as defined in claim 17, wherein the pressure difference threshold value, up to which the pressure values supplied will be regarded as corresponding one to the other, is selected to be 5% up to 10% of the nominal tire pressure recommended or prescribed by a vehicle manufacturer.

19. The method as defined in claim 17, wherein the tire pressure threshold value up to which the signaled pressure values are regarded as corresponding one to the other, is selected to be 0.4 bar for commercial vehicles.

20. The method as defined in claim 2, wherein the driver is informed, when the tire pressure values signaled to the evaluation unit correspond one to the other, but deviate from the nominal tire pressure recommended or prescribed by the vehicle manufacturer.

21. The method as defined in claim 2, wherein the threshold value is adapted when the tire pressure values signaled to the evaluation unit correspond one to the other, but deviate from a nominal tire pressure recommended or prescribed by the vehicle manufacturer.

22. The method as defined in claim 21, wherein the threshold value is adapted in proportion to a relative deviation of the signaled tire pressure from the nominal tire pressure.

23. The method as defined in claim 2, wherein in the case of vehicles having more than two axles the pressure sensors are placed on wheels mounted on a middle axle.

24. The method as defined in claim 2, wherein the expectation value of the speed difference, is adapted when a deviation from the tire pressure is measured in any of the wheels equipped with a pressure sensor.

* * * * *